M. H. KOWAL 3,191,800

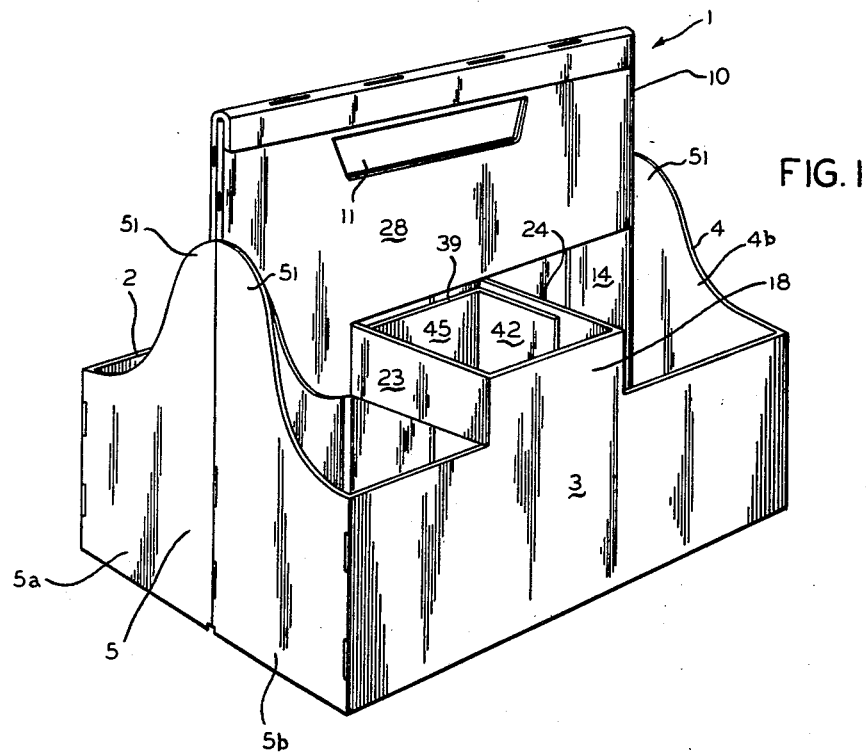
FIG. 1
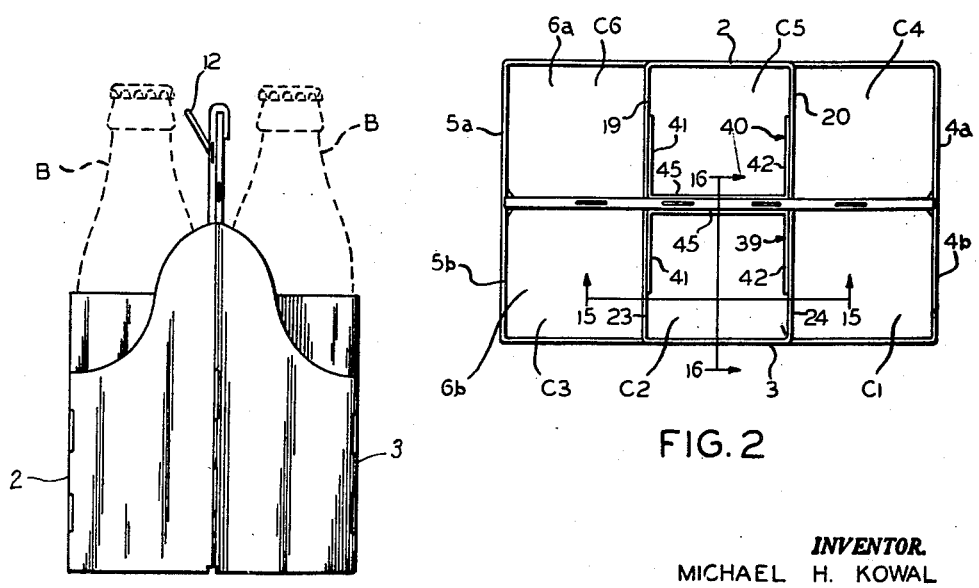
FIG. 2
FIG. 3
*INVENTOR.*
MICHAEL H. KOWAL
BY Charles B. Cannon
ATTORNEY June 29, 1965  M. H. KOWAL  3,191,800
BOTTLE CARRIERS
Original Filed July 11, 1960  6 Sheets-Sheet 3
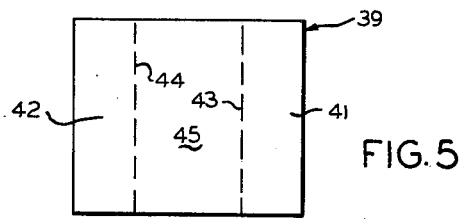
FIG. 5
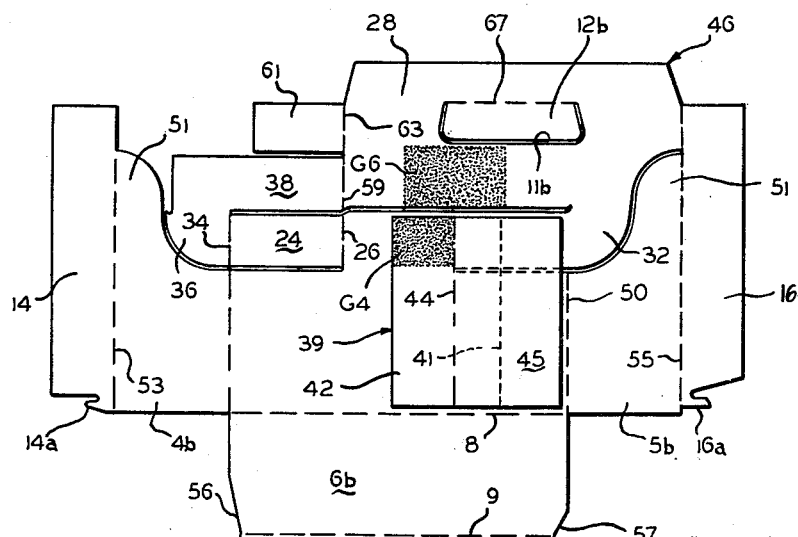
FIG. 6
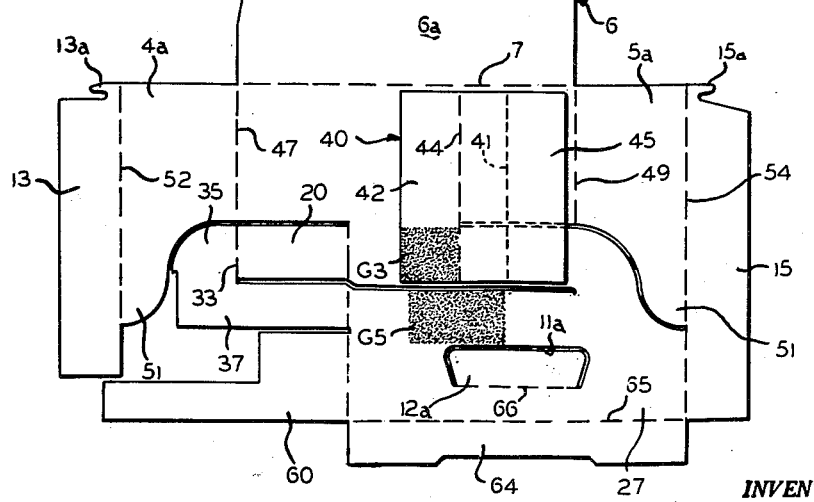
INVENTOR.
MICHAEL H. KOWAL
BY
Charles B. Cannon
ATTORNEY June 29, 1965

BOTTLE CARRIERS

Original Filed July 11, 1960

INVENTOR.
MICHAEL H KOWAL
BY
Charles B. Cannon
ATTORNEY

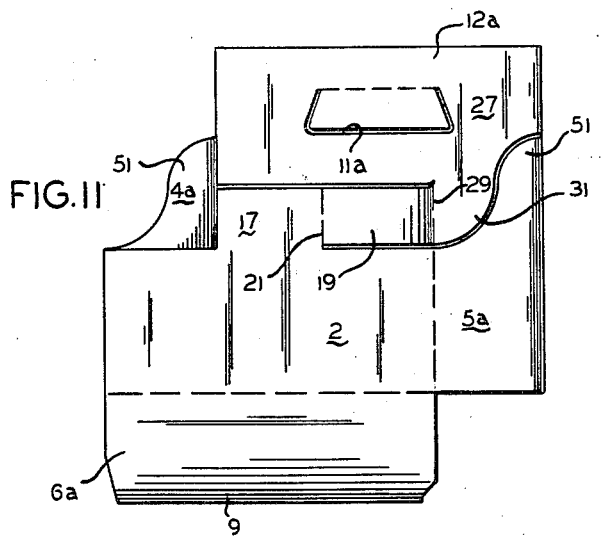
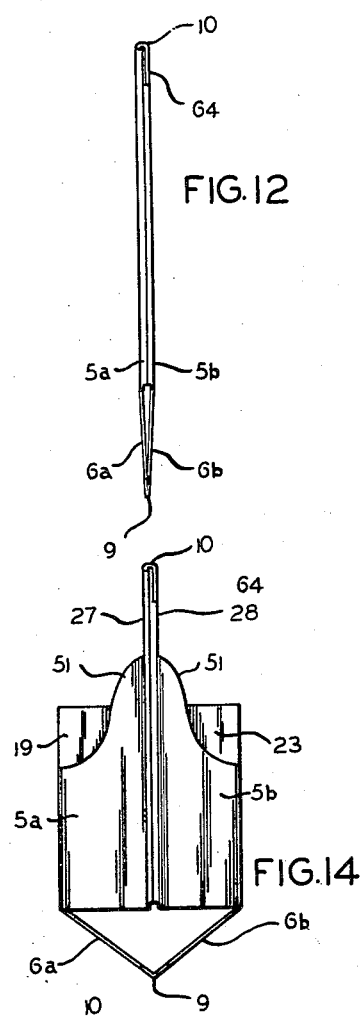
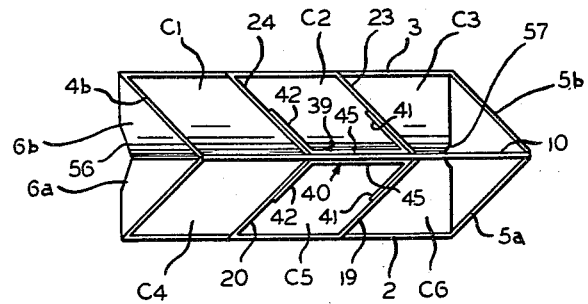
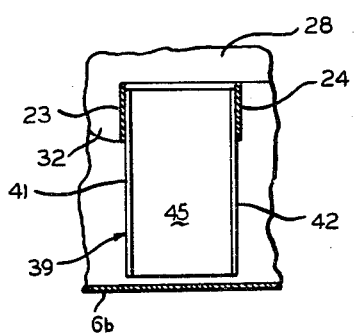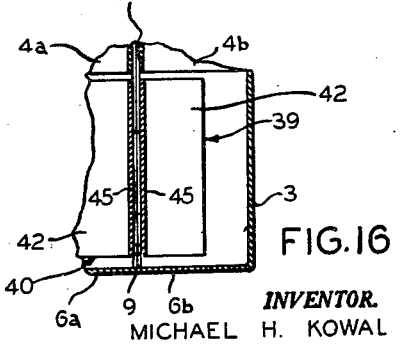

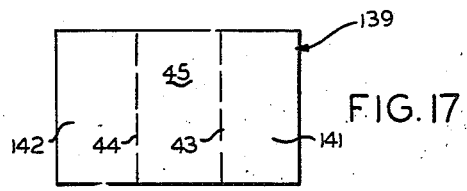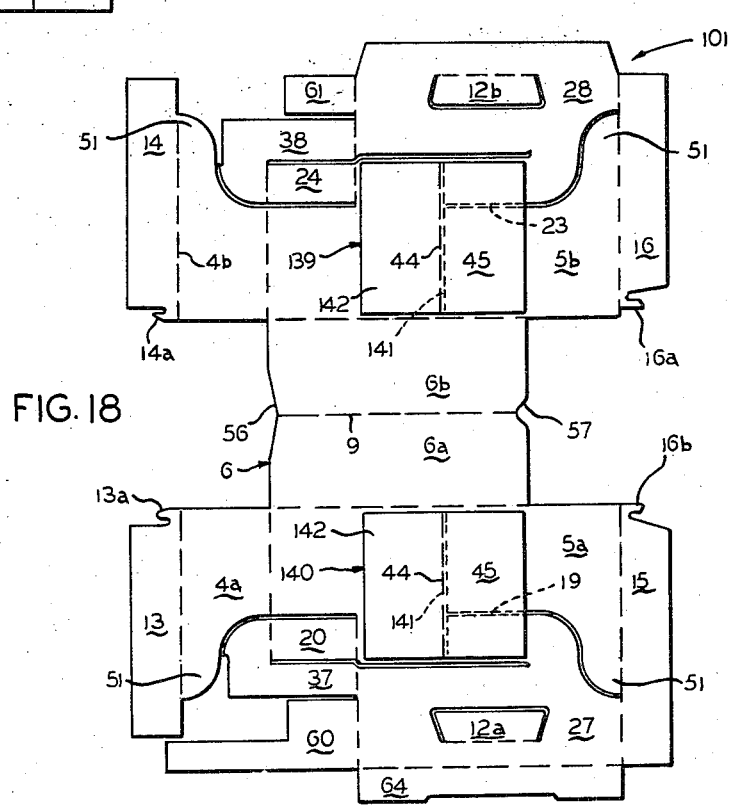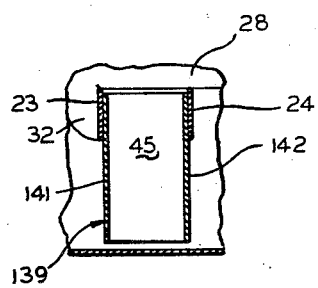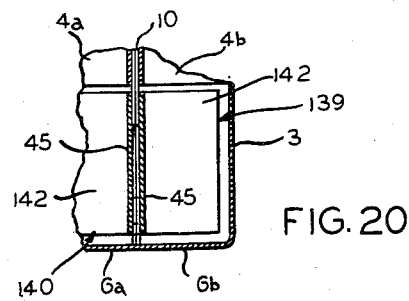

United States Patent Office 3,191,800
Patented June 29, 1965

3,191,800
BOTTLE CARRIERS
Michael H. Kowal, Smoke Rise, Kennelon Borough, N.J., assignor, by mesne assignments, to The Mead Corporation, Atlanta, Ga., a corporation of Ohio
Continuation of application Ser. No. 41,846, July 11, 1960. This application Apr. 2, 1963, Ser. No. 269,984
3 Claims. (Cl. 220—115)

This application is a continuation of my co-pending application, Serial No. 41,846, filed July 11, 1960 on "Bottle Carriers," now abandoned.

This invention relates to bottle carriers and particularly to pre-formed collapsible bottle carriers made from cardboard or like sheet material.

It is a primary object of the present invention to provide a novel main carrier blank body for a collapsible bottle carrier made from cardboard or like paperboard material and including a blank body sized, cut and scored to provide, in assembled and erected condition, a novel collapsible strap-type bottle carrier having separators between each adjacent pair of bottle compartments which are effective to insure that bottles disposed in such adjacent compartments will not strike or otherwise contact each other, together with a novel auxiliary carrier blank for converting the said main carrier blank body into a full depth style bottle carrier.

Highly successful and practical strap-type bottle carriers such as, for examle, my earlier issued United States Letters Patent No. 2,692,700 have been heretofore known in the art. It is an important object of the present invention to afford novel improvements over the strap-type bottle carriers which have heretofore been known.

Some of the strap-type bottle carriers which have been heretofore known in the art have embodied construction wherein the side walls thereof extended upwardly only a very limited distance so that bottles mounted in such carriers were exteriorly supported over a relatively small portion of their length. Other strap-type bottle carriers, such as the bottle carrier shown in my aforementioned Letters Patent No. 2,692,700, embody relatively high exterior walls, so that bottles disposed in such carriers are enclosed therein throughout a substantial portion of their length. It is another object of the present invention to afford novel improvements which are particularly applicable to the last mentioned types of bottle carriers.

In strap-type bottle carriers heretofore known in the art some, if not all, of the adjacent bottles disposed therein have commonly been able to contact each other. It is an important object of the present invention to prevent such contact between adjacent bottles in a strap-type bottle carrier in a novel and expeditious manner and by novel means embodied in the invention for converting a strap style carrier blank into a full depth bottle carrier.

Another object of the invention is to provide a main bottle carrier blank of the so-called strap style and which embodies a pair of novel blank members which are adapted to be adhesively secured to the said main carrier blank body in a novel manner, so as to convert the main strap style carrier blank into a full depth bottle carrier when the assembled carrier is in fully erected condition.

Another object of the invention is to provide a novel carrier of the aforementioned type which is strong and rugged in construction.

A further object is to enable a novel carrier of the aforementioned type to be afforded wherein all of the parts thereof are permanently attached together.

Another object of the present invention is to afford a novel carrier of the aforementioned type which may be readily manufactured commercially by efficient production line methods, including the use of automatic gluing and folding machines.

Yet another object is to provide a novel carrier of the aforementioned type which is practical and efficient in operation and construction, and which may be readily and economically produced commercially.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and purview of the appended claims.

In the drawings:

FIG. 1 is a perspective view of a bottle carrier embodying the principles of the present invention;

FIG. 2 is a top plan view of the carrier shown in FIG. 1;

FIG. 3 is an end view of the carrier shown in FIG. 1 showing the positions ocupied by bottles in the carrier;

FIG. 5 is a plan view of a partition blank of the type utilized in constructing the bottle carrier shown in FIG. 1;

Figure 4:
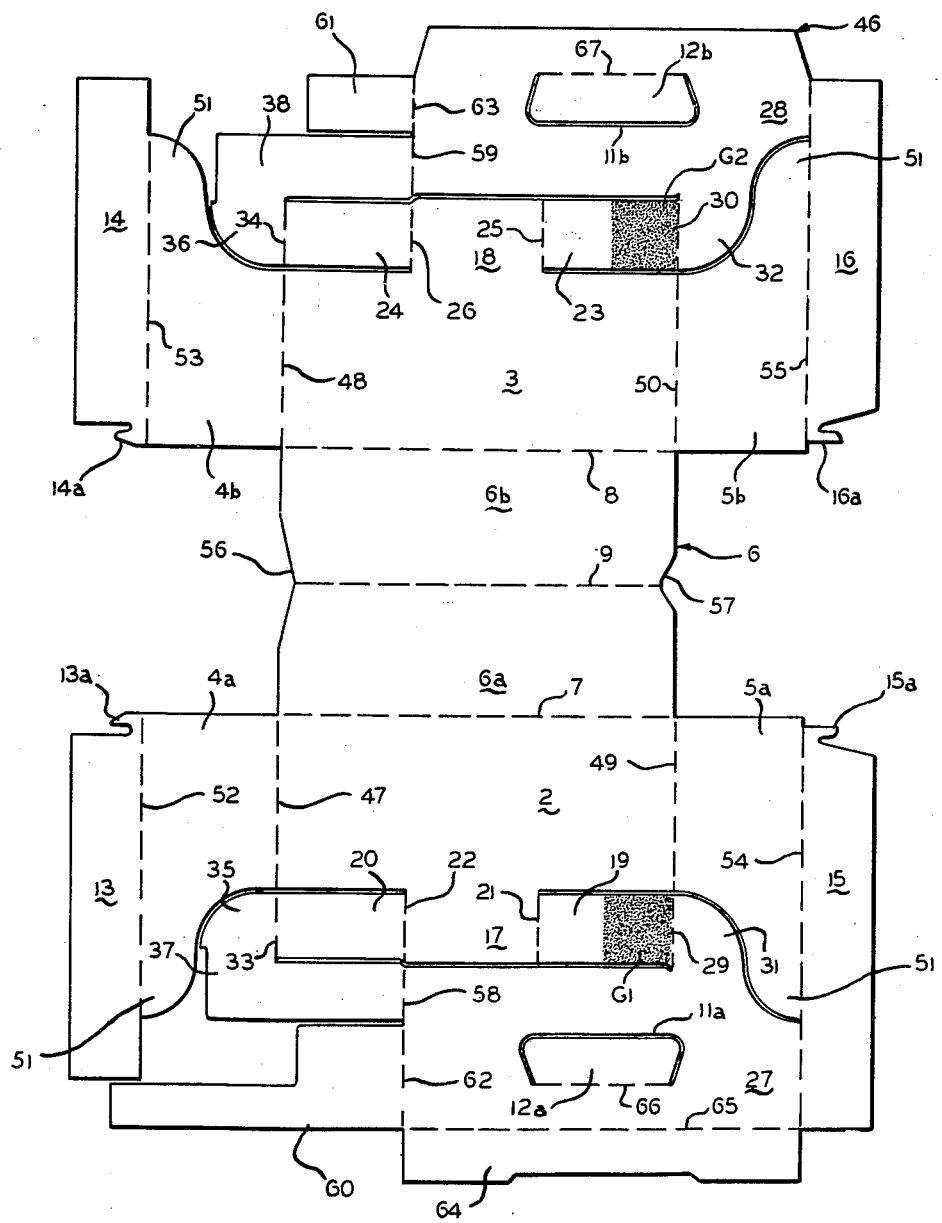
FIG. 4 is a plan view of what may be termed the inside face of the main blank utilized in constructing the bottle carrier shown in FIG. 1.

FIGS. 6 to 10, inclusive, are plan views showing the successive folding and gluing steps that are performed in the construction of the carrier shown in FIG. 1;

FIG. 11 is a face view of the carrier shown in FIG. 1, with the carrier disposed in collapsed form;

FIG. 12 is an end view of the collapsed carrier shown in FIG. 11;

FIG. 13 is a top plan view of the carrier shown in FIG. 1 with the carrier disposed in partially erected position;

FIG. 14 is an end view of the carrier in the condition shown in FIG. 13;

FIG. 15 is a fragmentary detail sectional view taken substantially along the line 15—15 in FIG. 2;

FIG. 16 is a fragmentary detail sectional view taken substantially along the line 16—16 in FIG. 2; and FIGS. 17–20 are views similar to FIGS. 5, 6, 15 and 16, respectively, but illustrating a modified form of the present invention.

A bottle carrier 1, which embodies the principles of the present invention, is shown in FIGS. 1 to 16, inclusive, of the drawings to illustrate the preferred embodiment of the present invention.

The bottle carrier 1 is of the type adapted to receive six bottles B in two parallel rows of three bottles each. It is made from a main carrier blank body of cardboard or like sheet material which is sized, cut and scored to provide a main strap style bottle carrier blank which, when erected, embodies two oppositely disposed upstanding side walls 2 and 3 that are connected at opposite ends by end walls 4 an 5, the end walls being made up of two panels 4a and 4b, and 5a and 5b, respectively, FIGS. 1 and 4. The lower edges of the two side walls 2 and 3 are connected together by a bottom wall 6 foldably connected to the lower edges of the side walls 2 and 3 along score lines or fold lines 7 and 8, respectively. The bottom wall 6 is made of two bottom panels 6a and 6b which are foldably connected to each other along a centrally disposed fold line 9 disposed midway between the two side walls 2 and 3.

In the erected carrier 1 an upstanding handle 10 having a finger receiving opening 11 and a cushioning flap 12 formed therein in the usual manner, is disposed in a plane that is midway between the two upstanding side walls 2 and 3, FIGS. 1, 2 and 3. The handle 10 is connected to the end walls 4 and 5 by riser panels or members 13, 14, 15 and 16 which extend upwardly into the handle 10 and connect the end wall panels 4a, 4b, 5a and 5b, respectively, to the handle 10, as will be discussed in greater detail presently. In the erected carrier 1, the panel 13 is disposed in parallel juxtaposition to the panel 14, and the panel 15 is disposed in parallel juxtaposition to the panel 16, with the pairs of panels 13 and 14, and 15 and 16, disposed closely adjacent to the end walls 4 and 5, respectively, and projecting inwardly therefrom toward each other to thereby afford bottle separating members between the end bottles in adjacent rows.

Each of the side walls 2 and 3 has an upward extension 17 and 18, respectively, in the middle one-third thereof, the extensions 17 and 18 being formed in an integral and uncreased relationship with respect to the remainder of the respective side walls 2 and 3, FIGS. 1 and 4. Separating bars or straps 19 and 20 are foldably connected to the extension 17 along fold lines 21 and 22, respectively, and separating bars 23 and 24 are connected to the upward extension 18 along fold lines 25 and 26, respectively. The separating bars 19, 20, 23 and 24 are connected to the side walls 2 and 3 at substantially the one-third points along the carrier 1. Each of the separating bars 23 and 24, in the erected carrier 1, extends from one end edge of the extension 18 to the related point along the lower edges of the handle 10, to thereby separate the area defined by the side wall 3, the handle 10 and the end panels 4b and 5b into three substantially equal size bottle compartments $C_1$, $C_2$ and $C_3$, FIGS. 1 and 2. Similarly, the separating bars 19 and 20, in the erected carrier 1, extend from respective edges of the extension 17 to the related point along the lower edge of the handle 10 to thereby divide the area defined by the side wall 2, the handle 10, and the end walls 4a and 5a into three aligned substantially equal size bottle compartments $C_4$, $C_5$ and $C_6$, which are disposed directly opposite to the compartments $C_1$, $C_2$ and $C_3$, respectively.

The handle 10 includes two handle panels 27 and 28 which, in the erected carrier 1, are disposed in closely adjacent parallel relation to each other as will be discussed in greater detail presently. It is to be observed that the separating bars 19 and 23 are hingedly connected along fold lines 29 and 30 to integral downwardly extending portions 31 and 32 of the handle panels 27 and 28, respectively, while the separating bars 20 and 24 are connected along fold lines 33 and 34 to the lower end portions 35 and 36 of joining panels 37 and 38, respectively. The joining panels 37 and 38 are disposed between the handle panels 27 and 28 in the erected carrier 1, to form downward extensions of the handle panels 27 and 28, respectively. Thus, it will be seen that the inner end portions of the separating members 19, 20, 23 and 24 are securely attached to the handle 10 in the carrier 1.

The riser panels 13–16 are of such width that when the carrier 1 is disposed in erected position as shown in FIG. 1, the panels 13 and 14 project more than half the distance from the end wall 4 to the plane of the separating bars 20 and 24, to thereby afford effective separation for bottles disposed in the end compartments $C_1$ and $C_4$; and the riser panels 15 and 16 extend more than half the distance from the end walls 5 to the plane of the separating bars 19 and 23 to thereby afford effective separators between bottles disposed in the other end panels $C_3$ and $C_6$. By the present invention I have enabled a novel, practical, collapsible, strap-type bottle carrier to be afforded wherein not only the adjacent end compartments $C_1$ and $C_4$, and $C_3$ and $C_6$, are effectively separated from each other, but the center compartments $C_2$ and $C_5$ are effectively separated from each other and from the adjacent end compartments $C_1$ and $C_3$, and $C_4$ and $C_6$, respectively. In this connection, it will be seen that the novel carrier 1 includes two identical auxiliary carrier blanks and converting members 39 and 40 disposed in the center compartments $C_2$ and $C_5$, respectively, of the erected carrier 1, FIGS. 1 and 2. The auxiliary carrier blanks or converting members 39 and 40 are made from suitable material such as, for example, cardboard, or the like, and each includes two end panels 41 and 42 foldably connected along fold lines 43 and 44 to opposite edges of a central panel 45, FIGS. 1, 2 and 5. These two auxiliary carrier blanks and converting members 39 and 40 are adapted to convert the strap-style main carrier blank body into a full depth bottle carrier.

In the erected carrier 1, the panels 41 and 42 of the auxiliary carrier blanks and converting member 39 are secured to the inwardly disposed faces of the separating members 23 and 24, respectively, in position to support the panel 45 thereof below the panel 28 of the handle 10 in substantially uniplanar relation thereto. Similarly, the end panels 41 and 42 of the sparating unit 40 are secured to the inwardly disposed faces of the separating bars 19 and 20 in position to support the central panel 45 thereof below the panel 27 of the handle 10 in substantially uniplanar relation thereto in the erected carrier 1. The panels 41, 42 and 45 of the separating units 39 and 40 are of such length that when they are so disposed in the erected carrier 1, with the upper edges thereof disposed closely adjacent to the upper edges of the separating bars 23 and 24, and 19 and 20, respectively, the bottom edges of each of the panels 41, 42 and 44 are disposed closely adjacent to the upper face of the bottom wall 6 of the carrier 1, FIGS. 15 and 16.

The central panels 45 of the separating units 39 and 40 extend between the separating bars 23 and 24, and 19 and 20, respectively, and the end panels 41 and 42 of each of the separating units 39 and 40 are of such width that, when the separating units 39 and 40 are disposed in the aforementioned operative position in the erected carrier 1, the end panels 41 and 42 of the separating units 39 and 40 project more than half the distance from the handle 10 toward the side walls 3 and 2, respectively. Thus, it will be seen that bottle separators are afforded between each of the compartments $C_1$–$C_6$ in the erected carrier 1, which are effective to separate bottles in all adjacent compartments and thereby prevent such bottles from directly contacting each other in the carrier 1. It will be appreciated by those skilled in the art that when, in the description of the carrier 1 it has been stated that the riser panels 13, 14, 15 and 16 extend more than half way between the end panels 4 and 5 and the adjacent separating bars 20 and 24 and 19 and 23, respectively, and that the panels 41 and 42 of the separating units 39 and 40 extend more than half way between the handle 10 and the side walls 3 and 2, respectively, to afford effective bottle separators, it is assumed that the compartments $C_1$–$C_6$ are of such size that the bottles to be carried in the carrier 1 fit therein with a relatively snug fit so that the bottles in adjacent compartments $C_1$–$C_6$ may not shift laterally in the compartments a sufficient distance to move the bottles in such adjacent compartments into position wherein the longitudinal center lines thereof are disposed in parallel relation to each other in a plane which does not pass through the particular separator separating bottles. This means, of course, that the separators should extend not less than half way across the compartments to be separated and, if the compartments are substantially wider than the bottles to be disposed therein, the separators should extend a sufficient distance across the compartments so as to insure that adjacent bottles in the carrier 1 cannot engage each other.

In producing the carrier 1, which is shown in FIG. 1 in its erected position, a blank 46 is made from cardboard, or like material, in the form illustrated in FIG. 4 of the drawings and two blanks are made from cardboard or like material in the form of the separator unit 39 shown in FIG. 5 of the drawings. These three blanks are suitably secured together such as, for example, by gluing to thereby afford the collapsible bottle carrier 1 as will be discussed in greater detail presently.

As shown in FIG. 4, the blank 46 includes, as the central portion thereof, the two bottom panels 6a and 6b joined together along the central longitudinal fold line 9. The side panels 2 and 3 are secured to the opposite longitudinal edges of the bottom panels 6a and 6b along the fold lines 7 and 8, respectively. The end panels 4a and 4b are secured to the left end edges of the side walls 2 and 3, as viewed in FIG. 4 (the right end edges, as viewed in FIGS. 1 and 2), along fold lines 47 and 48, respectively, the fold lines 47 and 48 terminating at one end at the fold lines 7 and 8 and at the other end in horizontal alignment with the lower edge of the extensions 17 and 18, respectively.

The end panels 5a and 5b are connected to the right end edges of the side walls 2 and 3, respectively, along fold lines 49 and 50, the fold lines 49 and 50 terminating at one end at the fold lines 7 and 8, and at their other ends in horizontal alignment with the lower edges of the extensions 17 and 18. The end panels 4a and 5a terminate at their lower edges in alignment with the fold line 7, and the end panels 4b and 5b terminate at their lower edges in alignment with the fold line 8. Each of the end panels 4a, 4b, 5a and 5b has an upper outer edge portion 51 which, in the erected carrier 1, extends above the upper edges of the side walls 2 and 3.

The riser panels 13–16 are attached to the outer edges of the end panels 4a, 4b, 5a and 5b in the blank 46 along fold lines 52, 53, 54 and 55, respectively. The upper ends of the riser panels 13 and 14 project upwardly above the extensions 51 on the end panels 4a and 4b, respectively, with the fold lines 52 and 53 terminating at their upper end portions at the upper ends of the end panels 4a and 4b. The riser panels 15 and 16 also project upwardly above the end panels 5a and 5b, respectively. However, the fold lines 54 and 55 do not terminate at the upper ends of the end panels 5a and 5b, but extend upwardly thereabove, and the riser panels 15 and 16 are attached to the handle panels 27 and 28 along these upward extensions of the fold lines 54 and 55, respectively. Hooks 13a, 14a, 15a and 16a are formed in the lower ends of the riser panels 13–16, respectively, in such position that the hooks 13a and 14a and the hooks 15a and 16a may supportingly engage the notched central end edge portions 56 and 57, respectively, of the bottom wall 6 when the bottle carrier 1 is disposed in erected condition.

The securing panels 37 and 38 are connected to the left edges, as viewed in FIG. 4, of the handle panels 27 and 28 along fold lines 58 and 59, respectively, in alignment with the fold lines 22 and 26 along which the separating bars 20 and 24 are connected to the side wall extensions 17 and 18, respectively. The securing panels 37 and 38 are disposed outwardly of the separating bars 20 and 24 with the lower end portions 35 and 36 thereof disposed between the separating bars 20 and 24 and the end panels 4a and 4b, respectively. Two reinforcing panels 60 and 61 are attached to the left upper edges of the handle panels 27 and 28 along fold lines 62 and 63, the fold lines 62 and 63 being disposed in alignment with each other and in alignment with the fold lines 22, 26, 58 and 59. A reinforcing flap 64 is secured to the upper edge of the handle panel 27 along the fold line 65, the fold line 65 extending along the upper edge of the handle panel 27, and being disposed in alignment with the upper edge of the riser panel 15 and the upper edge of the reinforcing panel 60. Each of the handle panels 27 and 28 has a finger opening 11a and 11b, respectively, formed therein with a cushioning flap 12a and 12b disposed in the openings 11a and 11b, respectively, and secured to the upper longitudinal edges thereof along fold lines 66 and 67, respectively.

With the carrier 1 constructed from the blank 46 and the two supporting units 38 and 40, the successive gluing and folding operations may be performed in substantially the sequence shown by FIGS. 4 and 6–10, inclusive, of the drawings. However, it will be appreciated by those skilled in the art that in many instances it may be desirable to perform at least certain of the folding and gluing operations illustrated sequentially in FIGS. 4 and 6–10 concurrently rather than in sequence.

Thus, as the first operation shown in FIGS. 4 and 6–10, glue is applied to the glue areas $G_1$ and $G_2$ on the inner faces of the separating bars 19 and 23 adjacent to the fold lines 29 and 30, these areas being the ones to which the separating units 40 and 39, respectively, are to be attached. The supporting units 40 and 39 may then be disposed on the blank 46 in the position shown in FIG. 6, with the panels 41 thereof disposed under the respective panels 45 and engaged with the glue areas $G_1$ and $G_2$, respectively. The separating units 40 and 39 are thus attached to the separating bars 19 and 23 in overlying relation to the inner faces of the side walls 2 and 3 with the fold lines 43 disposed in inwardly spaced parallel relation to the fold lines 49 and 50 on the blank 46, and with the upper and lower edges of the separating units 40 and 39 disposed in inwardly spaced relation to the upper and lower edges of the side walls 2 and 3, respectively, as shown in FIG. 6.

Glue may then be applied to the areas $G_3$ and $G_4$ on the upper ends of the panels 42 of the separating units 40 and 39, respectively, and to the areas $G_5$ and $G_6$ on the handle panels 27 and 28, as shown in FIG. 6. The securing panels 37 and 38 and the separating bars 20 and 24 may then be swung inwardly around the lines 58, 59, 22 and 26, respectively, into the position shown in FIG. 7. In this position, the end portions of the separating bars 20 and 24 disposed adjacent to the fold lines 33 and 34, respectively, are disposed in overlying relation to the glue areas $G_3$ and $G_4$, respectively, and are secured by the glue in these areas to the panels 42 of the separating units 40 and 39, respectively. At this same time, the upper end portions of the securing panels 37 and 38 are secured to the inner faces of the handle panels 27 and 28 by the glue in the areas in $G_5$ and $G_6$, respectively.

Figure 7:
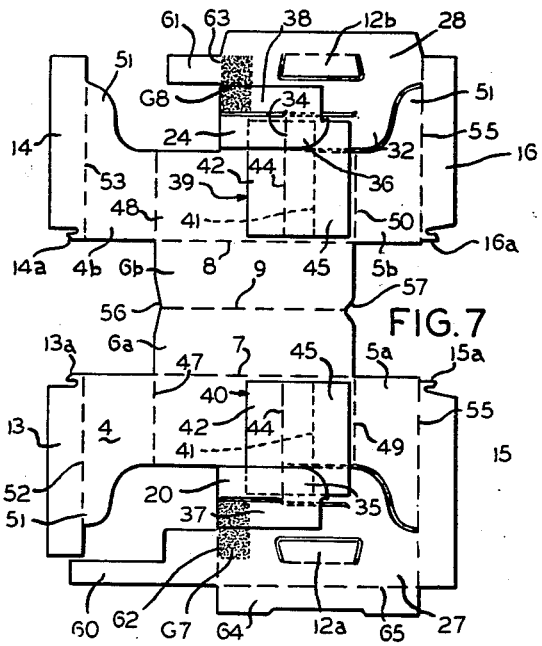

Thereafter, glue may be applied to the glue areas $G_7$ and $G_8$ shown in FIG. 7. As may be seen in FIG. 7, the area $G_7$ covers the then inner face of the end portion of the securing panel 37 adjacent to the fold line 58 and extends upwardly therefrom onto the inner face of the handle panel 27 and terminates at its upper edge in horizontal alignment with the upper end of the riser panel 13. Similarly, the glue area $G_8$ is disposed on the end portion of the securing panel 38 adjacent to the fold line 59 and extends upwardly therefrom onto the inner face of the handle panel 28 and terminates at its upper edge in horizontal alignment with the upper end of the riser panel 14. Thereafter, the end panels 4a and 4b with the riser panels 13 and 14 carried thereby may be swung inwardly into the position shown in FIG. 8 wherein the riser panels 13 and 14 are disposed in overlying relation to the glue areas $G_7$ and $G_8$, respectively, and are secured by the glue in these areas to the inner faces of the handle panels 27 and 28 and the inner faces of the securing panels 37 and 38 as shown in FIG. 8.

Figure 8:
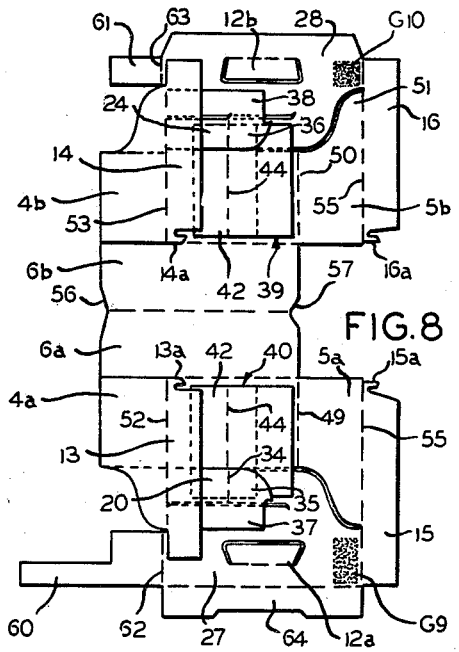

Glue may then be applied to the glue areas $G_9$ and $G_{10}$, FIG. 8, these areas being the areas to which the riser panels 15 and 16 are to be adhesively secured to the inner faces of the handle panels 27 and 28, respectively. The glue areas 9 and 10 are disposed adjacent to the upper end portions of the fold lines 54 and 55 and project inwardly therefrom a distance substantially equal to the width of the upper end portions of the riser panels 15 and 16, respectively. After glue has been applied to the areas $G_9$ and $G_{10}$, the riser panels 15 and 16 may be folded inwardly into the position shown in FIG. 9, wherein they are adhesively secured by the glue on the glue areas $G_9$ and $G_{10}$ to the handle panels 27 and 28.

Figure 9:
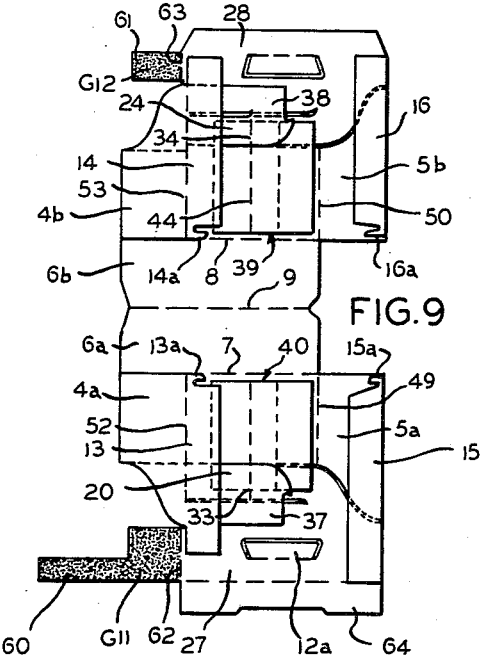

Thereafter, glue may be applied to the glue areas $G_{11}$ and $G_{12}$ shown in FIG. 9. It will be seen that the areas $G_{11}$ and $G_{12}$ are the entire inner faces of the reinforcing panels 60 and 61, respectively, and after the glue has thus been applied to the areas $G_{11}$ and $G_{12}$, the reinforcing panels 60 and 61 may be folded inwardly around the fold lines 62 and 63 into the positions shown in FIG. 10, wherein they are adhesively secured in closely overlying relation to the handle panels 27 and 28, respectively. It will be noted that when the reinforcing panel 60 is thus turned inwardly, the lower edge portion thereof is disposed in overlying relation to the upper end portion of the riser panel 13, and the upper end portion of the reinforcing panel 60 extends along the upper end portion of the handle panel 27 between the opening 11a and the fold line 65, to thereby afford both a retaining member for the riser 13, and reinforcing member for the upper end portion of the handle 10. The reinforcing panel 61 is so disposed on the handle panel 28, and is of such length, that when it is folded inwardly into the aforementioned position wherein it is disposed in overlying position to the inner face of the handle panel 28, as shown in FIG. 10, it is disposed in overlying relation to the upper end portion of the riser panel 14 and projects inwardly therefrom toward the opening 11b, terminating in spaced relation to the latter.

Figure 10:
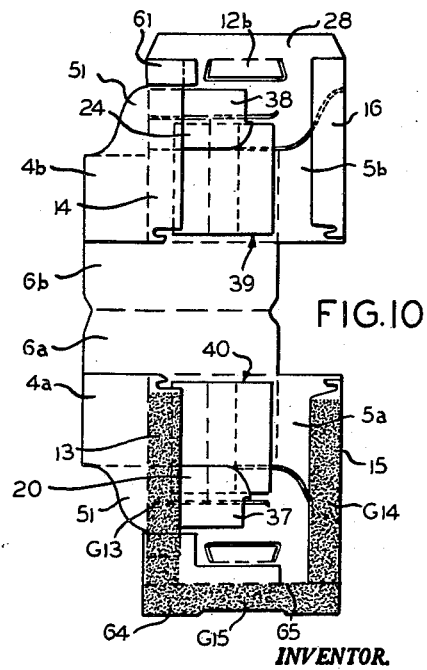

After the reinforcing panels have thus been adhesively secured in overlying relation to the inner faces of the handle panels 27 and 28, glue may be applied to the glue areas $G_{13}$, $G_{14}$, and $G_{15}$ as shown in FIG. 10. It will be noted that the glue area $G_{13}$ extends along the riser panel 13 from a point closely adjacent the bottom edge portion thereof upwardly across the inwardly disposed face of the reinforcing panel 60 to a point closely adjacent the fold line 65, the glue area $G_{13}$, throughout its length, being substantially the width of the riser panel 13. Similarly, it will be seen that the glue area $G_{14}$ extends along the then inwardly disposed face of the riser panel 15 from a point closely adjacent the lower edge thereof to a point adjacent the upper edge thereof, the upper edge portion of the riser panel 15 projecting upwardly above the upper edge portion of the riser panel 13. The glue area $G_{15}$ entirely covers the inner face of the reinforcing flap 64. After glue has thus been applied to the areas $G_{13}$, $G_{14}$ and $G_{15}$, the blank 46 may be folded along its longitudinal center line 9 to thereby bring the two halves of the carrier 1 separated by the fold line 9 into juxtaposition to each other, with the riser panels 14 and 16 disposed in engagement with the glue on the glue areas $G_{13}$ and $G_{14}$, respectively, to thereby secure the two halves of the carrier 1 together. The flap 64 may then be turned over the upper edge portion of the handle panel 28 and secured to the outer face thereof by the glue on the glue area $G_{15}$. This last folding operation is effective to complete the carrier 1 in the collapsed form shown in FIGS. 11 and 12, and the carrier 1 is normally shipped and stored in this collapsed form.

When it is desired to erect the carrier 1, force may be applied to the left-hand edge of side wall 2 and to the right-hand edge of end wall 5, as viewed in FIG. 11. This causes the carrier 1 to move toward the relationship shown in FIG. 13, and when this movement has been continued until the handle 10 is disposed directly above the bottom wall 6 and extends longitudinally thereacross, the longitudinal central portion of the bottom wall 6 may be manually snapped upwardly into engagement with the hooks formed by the hook members 13a and 14a and the hook members 15a and 16a, respectively, at the left and right ends of the handle 10, as viewed in FIGS. 11 and 13 (these hooks being at the right and left ends of the handle member 10, as viewed in FIGS. 1 and 2). It will be seen that during such erection of the carrier 1, the separating units 39 and 40 move with the separating bars 23 and 24 and the separating members 19 and 20, respectively, so that when the carrier is moved from the collapsed position shown in FIG. 11 to fully erected position shown in FIG. 1, the supporting units 39 and 40 are automatically moved into fully raised position wherein they are effective to prevent engagement between bottles disposed in chambers $C_2$ and $C_5$, as well as between those bottles and the bottles disposed in the adjacent end compartments $C_1$, $C_3$, $C_4$ and $C_6$, respectively. At the same time, the riser panels 13 and 14 and the riser panels 15 and 16 extend inwardly from the end walls 4 and 5, respectively, at least half way to the separating bars 20 and 24, and 19 and 23, to thereby effectively separate bottles in compartments $C_1$ and $C_3$, from bottles in compartments $C_4$ and $C_6$, respectively.

In this fully erected condition, the carrier 1 may be disposed in the conventional cases used in the bottle industry, and the bottle-loading operations may be performed readily and easily, and conventional case-loading machinery may be used if desired.

The carrier 101 shown in FIGS. 17 to 20, inclusive, of the drawings to illustrate a modified form of the present invention, embodies the same construction as the carrier 1 shown in FIGS. 1–16, inclusive, except that a different type of separating unit is used therein. Parts shown in FIGS. 17 to 20, inclusive, which are the same as parts shown in FIGS. 1 to 16, inclusive, are indicated by the same reference numerals, and parts which are similar to, but have been substituted for, parts embodied in the carrier 1, are indicated by the same reference numerals as the corresponding parts embodied in the carrier 1 with the prefix "1" added thereto.

The only difference between the carrier 101 and the carrier 1 is that the auxiliary carrier blanks and converting members 139 and 140 embody end panels 141 and 142 which are of such width that, in the erected carrier 101, the panels 141 and 142 extend completely across the chambers $C_2$ and $C_5$ from the handle 10 to the walls 3 and 2, respectively. With this construction, it will be seen that the central chambers $C_2$ and $C_5$ are substantially completely separated from each other, as is also true of the chambers $C_2$ and $C_5$ of the carrier 1, and, in addition, the central chambers $C_2$ and $C_5$ are substantially completely separated from the adjacent end chambers $C_1$ and $C_3$, and $C_4$ and $C_6$, respectively, whereas in the carrier 1, the chambers $C_2$ and $C_5$ are separated by the separating units 39 and 40 from the end chambers adjacent thereto only to an extent sufficient to insure that bottles in adjacent chambers will not be permitted to directly contact each other.

From the foregoing it will be apparent that the present invention enables the main pre-formed collapsible strap-type bottle carrier blank to be converted into a full depth carrier to afford complete and efficient separation of bottles in all adjacent compartments thereof, to be made from cardboard and like materials in a practical, simple and economical manner and by means of the novel auxiliary blank and converting members 39–40 and 139–140 which are embodied in the invention.

Also, it will be seen that the present invention enables a bottle carrier and a carrier blank therefor which may be glued and assembled in automatic gluing and folding machines.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A bottle carrier blank construction for a collapsible bottle carrier made from cardboard, or like paperboard material, and comprising a main carrier blank body sized, cut and scored to form a strap-style bottle carrier which includes a pair of bottom panels having inner edge portions joined together along a central longitudinal fold line, a pair of side wall panels having outer end edge portions and having inner edge portions integrally joined along fold lines to said bottom panels, two pairs of end wall panels each having an inner end edge portion hingedly connected to the said outer end edge portion of one of said side wall panels along a fold line, each of said end wall panels having an outer edge portion, a riser panel hingedly connected to the said outer edge portion of each of the said end wall panels, the said riser panels at each end of the said carrier blank body being adapted to be adhesively secured together in face-to-face relation and to project inwardly to afford hinged connections between the said end wall panels at the ends of the said carrier blank body, each of the said riser panels having an outer edge portion integrally joined thereto and extending substantially beyond the outer edge of the corresponding one of said end wall panels, a handle panel arranged between each pair of the said riser panels and adapted to be rigidly secured to a pair of said riser panels and to each other to afford a weight-transmitting connection through said riser panels between said handle panels and said end wall panels in the erected condition of the said carrier blank body, each of the said side wall panels having an integral median extension panel formed thereon and projecting outwardly therefrom medially of the corresponding one of the said side wall panels, a pair of bottle-separating strap panels arranged at opposite sides of each of the said median side wall extension panels, each of the said bottle-separating strap panels having an inner edge portion hingedly connected along a fold line to a corresponding one of said median extension side wall panels, and means for converting said strap-style main carrier blank body to a full depth style bottle carrier comprising a pair of substantially rectangular-shaped auxiliary blank and converting members each including a center panel and two end panels hingedly connected to the said center panel along fold lines, one of the said end panels of each of said auxiliary blank and converting members being underfolded under the said center panel thereof along a fold line and having only an outer end portion thereof adhesively secured to a first one of said bottle-separating strap panels in a pair thereof and the other end panel of each of said auxiliary blank and converting members having only an outer end portion thereof adhesively secured to the other one of said bottle-separating strap panels in a pair thereof for movement of said end panels of said auxiliary blank and converting members with said bottle-separating strap panels between a flat collapsed condition and a fully erected condition, two of said bottle-separating strap panels cooperating with said end wall panels, said handle panels, and one of said side wall panels, in the erected condition of said main bottle carrier blank, to provide a center bottle compartment and two end bottle compartments disposed on opposite sides of said center bottle compartment, the other two of said bottle-separating strap panels cooperating with said handle panels and with the other of one of said side wall panels and with said end wall panels, in the erected condition of said bottle carrier blank, to provide a second center bottle compartment opposite the said first-named center bottle compartment and two other end bottle compartments disposed on opposite sides of said second-named center bottle compartment, the said auxiliary blank and converting members being secured by the said adhesive connection of the said end panels thereof to the said bottle-separating strap panels, each of the said panels of each of said auxiliary blank and converting members being substantially coextensive in height with the depth of the said side wall panels including the said median upward extensions thereof so as to provide substantially full depth bottle separation between said center bottle compartments and the adjacent end bottle compartments when the said carrier blank is in fully erected condition.

2. A bottle carrier blank construction as defined in claim 1 in which the overall width of each of said auxiliary blank and converting members, when adhesively secured in position of use on said carrier blank body, is substantially less than the combined length of the underlying one of said bottle-separating strap panels to which the outer end portion of the underfolded end panel of the corresponding one of said auxiliary blank and converting members is adhesively secured plus the width of the said median side wall extension panel disposed below the said auxiliary blank and converting members.

3. A bottle carrier blank construction as defined in claim 1 in which the overall width of each of said auxiliary blank and converting members, when adhesively secured in position of use in said main carrier blank body, is substantially equal to the combined length of the underlying one of said bottle-separating strap panels to which the outer end portion of the said underfolded end panel thereof is adhesively secured plus the width of the said median extension side wall panel disposed below the said main carrier blank and converting members.

References Cited by the Examiner
UNITED STATES PATENTS

| | | | |
|---|---|---|---|
| 1,977,102 | 10/34 | Wheeler | 220—113 |
| 2,630,264 | 3/53 | Holy | 220—113 |
| 2,765,100 | 10/56 | De Maria | 220—113 |
| 3,017,054 | 1/62 | Forrer | 220—113 |

FRANKLIN T. GARRETT, *Primary Examiner.*

GEORGE O. RALSTON, *Examiner.*